(No Model.)

M. HARMON
CAR COUPLING.

No. 324,108. Patented Aug. 11, 1885.

Witnesses:
A. Pavetti
Wm C. Richmond

Inventor:
Martin Harmon
per.
Chas F. Meisner.
Attorney.

UNITED STATES PATENT OFFICE.

MARTIN HARMON, OF EAST ST. LOUIS, ILLINOIS.

CAR-COUPLING.

SPECIFICATION forming part of Letters Patent No. 324,108, dated August 11, 1885.

Application filed June 4, 1885. (No model.)

*To all whom it may concern:*

Be it known that I, MARTIN HARMON, a subject of the King of Prussia, residing at East St. Louis, in the county of St. Clair and State of Illinois, have invented certain new and useful Improvements in Automatic Car-Couplings, of which the following is a specification.

The object of my invention is to provide a cheap, durable, and effective car-coupling, by means of which cars can be automatically coupled together, and may be uncoupled by means of a rod or lever extending either to the sides of freight-cars, or to the platform of coaches, or to the top of the former, within reach, thereby avoiding the necessity of going between the cars, and insuring safety to life and limb, this improvement being also adapted to couple with the ordinary link-coupling now in use, and is applicable to passenger-coaches as well as freight-cars.

To more fully describe my invention, and to enable others to fully understand the construction and operation of the same, reference is had to the accompanying drawings, in which—

Figure 1:
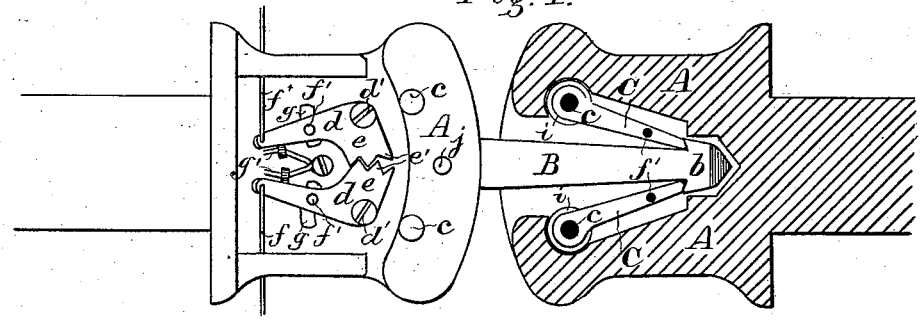
Figure 2:
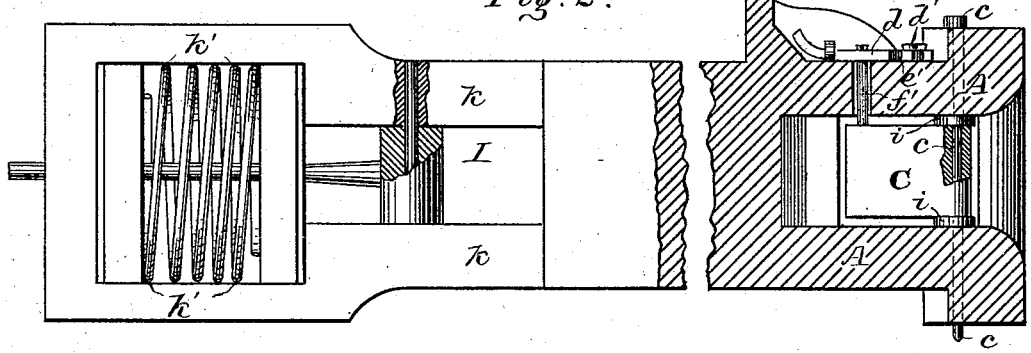
Figure 3:
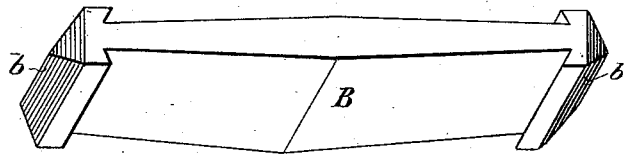

Figure 1 is a top plan of one draw-head, showing the outside improvement, and a plan section of another draw-head, clearly showing the inside improvements, the two being represented as coupled together. Fig. 2 is a side view and part section of my improved coupling. Fig. 3 is a perspective view of the draw-bar.

Similar letters refer to similar parts throughout the several views.

A represents the draw-head; B, the connecting draw-bar, each end of which is provided with a spear or arrow head, $b$. (See Fig. 3.) One spear-head enters the draw-head of one car, while the other spear-head enters the draw-head of the opposite car.

Within the draw-head B, I provide two wings or arms, C, opposite each other, and hinged to turn on pins $c\ c$ in the forward end of the said draw-head. These wings C extend back to the rear of the draw-head, and engage back of the spear or arrow head $b$ of the draw-bar, as clearly shown in Fig. 1, when the coupling is made. To enable the operator to disengage these wings from the draw-bar and to uncouple the cars, the following provisions are made: Directly top of the draw-head and over each wing are pivoted the levers $d$ and $d$, turning on pins or bolts $d'\ d'$ as their fulcrum. The short arm $e\ e$ of each lever is curved around toward the center line of the draw-head, and are each provided with teeth $e'\ e'$, the teeth of one lever meshing with those of the other, as clearly shown in Fig. 1. The purpose of thus engaging the two levers with one another is to cause them both to operate together and alike at the same time. The long arm of each lever extends back, as shown, and has attached to its extreme end a rod or chain, $f$, which latter extends to the side, top, or platform of the car, within reach of the operator. A rod or pin, $f'$, is passed vertically through each lever at about the middle of the long arm, (see Figs. 1 and 2,) and extends and connects to the wing C directly underneath, passing through a slot, $g\ g$, cut into the top of the draw-head. (See Figs. 1 and 2.) These rods $f'$ may be screw-threaded at their lower end to securely engage into the wings C. As the rod $f$ is now pulled, the levers are turned with the long arms away from each other, thus spreading apart, at the same time causing the rods $f'$ of each lever to turn their respective wing C back and out of engagement with the draw-bar arrow-head. Upon releasing the rod or chain $f$ a spring, $g'$, provided between the two levers to the top of the draw-head and connected with each lever, as shown in Fig. 1, draws both levers together with the long arms, and thereby returning the wings C back to original position. The wedge-shaped point of the arrow-head, on entering the draw-head, forces the wings apart until the whole head has passed beyond the wings, when the latter, caused by the tension of the spring $g'$, close against the neck and into the gills $h$, making the lock, and holding the draw-bar secure and firm, at the same time allowing sufficient play of the head caused by the motion of the cars. As will be seen, great strength and durability of the wings is achieved, the strain on the same being distributed over the bolts or pins $c$ for the entire depth of the wings. $i$ is a washer or lug placed below and above the wings, which leave the latter free to swing on their respective pins. In case a car provided with my coupling is required to be coupled with a car having the ordinary link-coupling, the draw-bar is removed and a pin is inserted through a hole, $j$, provided in the middle of the draw-head, and the two are coupled together in the ordinary way. The shank I of the draw-bar proper is strengthened by increased thickness of metal at $k$; and $k'$ is the ordinary cushion-spring in the rear.

Having thus fully described the construction and operation of my invention, what I claim is—

In a car-coupling, the wings C C, pivoted and turning on the pins $c\ c$, levers $d\ d$, provided with teeth $e'$, and pivoted and turning on pins $d'\ d'$, spring $g'$, rods $f$, slot $g$ in the draw-head A, and the draw-bar B, all combined substantially as herein shown and described, and for the purpose set forth.

In testimony of said invention I have hereunto set my hand.

MARTIN HARMON.

Witnesses:
CHAS. F. MEISNER,
JOHN JORDAN.